(12) United States Patent
Xie et al.

(10) Patent No.: US 12,178,193 B2
(45) Date of Patent: Dec. 31, 2024

(54) **METHOD FOR MASS REARING OF *TELENOMUS REMUS***

(71) Applicants: YUNNAN TOBACCO CO., LTD. KUNMING BRANCH, Kunming (CN); YUNNAN PUSHER BIOTECHNOLOGY CO., LTD., Kunming (CN)

(72) Inventors: Yonghui Xie, Kunming (CN); Zhengling Liu, Kunming (CN); Dekai Ning, Kunming (CN); Hongming Li, Kunming (CN); Zhonglong Lin, Kunming (CN); Jingyu Shi, Kunming (CN); Zhijiang Wang, Kunming (CN); Aimin Shi, Kunming (CN); Yu Shen, Kunming (CN); Youguo Zhan, Kunming (CN); Xiaofei Gu, Kunming (CN); Dingguo Shi, Kunming (CN); Facong Qian, Kunming (CN); Shiyou Deng, Kunming (CN); Duo Wang, Kunming (CN); Dongya Xu, Kunming (CN); Linqing Tian, Kunming (CN); Yuanshen Wang, Kunming (CN); Qinglin Rao, Kunming (CN); Xianlong Ding, Kunming (CN); Zhuoheng Li, Kunming (CN)

(73) Assignees: YUNNAN TOBACCO CO., LTD. KUNMING BRANCH, Kunming (CN); YUNNAN PUSHER BIOTECHNOLOGY CO., LTD., Kunming (CN)

( * ) Notice: Subject to any disclaimer, the term of this patent is extended or adjusted under 35 U.S.C. 154(b) by 0 days.

(21) Appl. No.: 18/663,130

(22) Filed: May 14, 2024

(65) Prior Publication Data
US 2024/0389558 A1 Nov. 28, 2024

(30) Foreign Application Priority Data

May 26, 2023 (CN) .......................... 202310608005.1

(51) Int. Cl.
*A01K 67/00* (2006.01)
*A01K 51/00* (2006.01)

(52) U.S. Cl.
CPC .................................. *A01K 51/00* (2013.01)

(58) Field of Classification Search
CPC ................................................... A01K 67/033
See application file for complete search history.

(56) References Cited

FOREIGN PATENT DOCUMENTS

| CN | 101564024 A | 10/2009 |
|----|-------------|---------|
| CN | 101790966 A | 8/2010 |

(Continued)

OTHER PUBLICATIONS

Wu Zhimei, et al., Screening of Host Species for the Mass Real.ing of Tekno,nus remus Nixon (Hymenoptera: Platygastridae), Chinese Journal of Biological Control, 2021, pp. 1140-1145.

(Continued)

*Primary Examiner* — Monica L Perry
*Assistant Examiner* — Henry Hooper Mudd
(74) *Attorney, Agent, or Firm* — Bayramoglu Law Offices LLC

(57) ABSTRACT

A method for mass rearing of *Telenomus remus* includes the following steps: (1) establishing a *Telenomus remus* population of a *Corcyra cephalonica* strain; (2) collecting *Corcyra cephalonica* eggs laid by *Corcyra cephalonica* on the day, and fixing the *Corcyra cephalonica* eggs on a sticker; (3) inoculating female *Telenomus remus* of the *Corcyra cephalonica* strain in the step (1) into the *Corcyra cephalonica* eggs in the step (2); and (4) after 24 h to 48 h of a parasitism, taking parasitic *Corcyra cephalonica* eggs (Continued)

out, and feeding the parasitic *Corcyra cephalonica* eggs under the following conditions: a temperature: 26±1° C., a relative humidity: 65±5%, and a photoperiod: L:D=14:10, where long axes of the *Corcyra cephalonica* eggs in the step (2) have a length of 0.48 mm to 0.60 mm. The method of the present disclosure has great significance for the long-term control of pests of the Noctuidae family.

9 Claims, 1 Drawing Sheet

(56) References Cited

FOREIGN PATENT DOCUMENTS

| CN | 103782969 A | 5/2014 |
|---|---|---|
| CN | 111758673 A | 10/2020 |
| CN | 111758673 B | 11/2021 |
| CN | 115245146 A | 10/2022 |

OTHER PUBLICATIONS

Jiguo Geng, et al., Insect Ecology and Forecasting Experiment Guide, China National Standart, pp. 1-139, Agricultural Press.

Chen Li, et al., Olfactory Response of l'ele11omus remw, Nixon to the Volatile Information Objects from Spodoptera exigua (Hubner), Journal of Changjiang Vegetables, 2010, pp. 4-7, vol. 18.

Chen Wanbin, et al., Research Progress in mass-rearing and utilization of Telenomus remus Nxion, Plant Protection, 2021, pp. 11-20, 48, vol. 47 No. 6.

Gangrou Xiao, ISBN 7-5038-0850-0/S 0438, Forest Insects of China, China National Standards, 1991, pp. 1246-1247.

Dai Peng, et al., Discovery of Three Egg Parasitoid Species for the Control of Spodoptera frugiperda ( Smith), Journal of Jilin Agricultural University, 2019pp.505-509, vol. 41 No. 5.

Huo Liangxiao, et al., Biologial characteristics of telenomus remus against Spodoptera firugiperda and Spodoptera litura eggs, Plant Protection, 2019, pp. 60-64, vol. 45 No. 5.

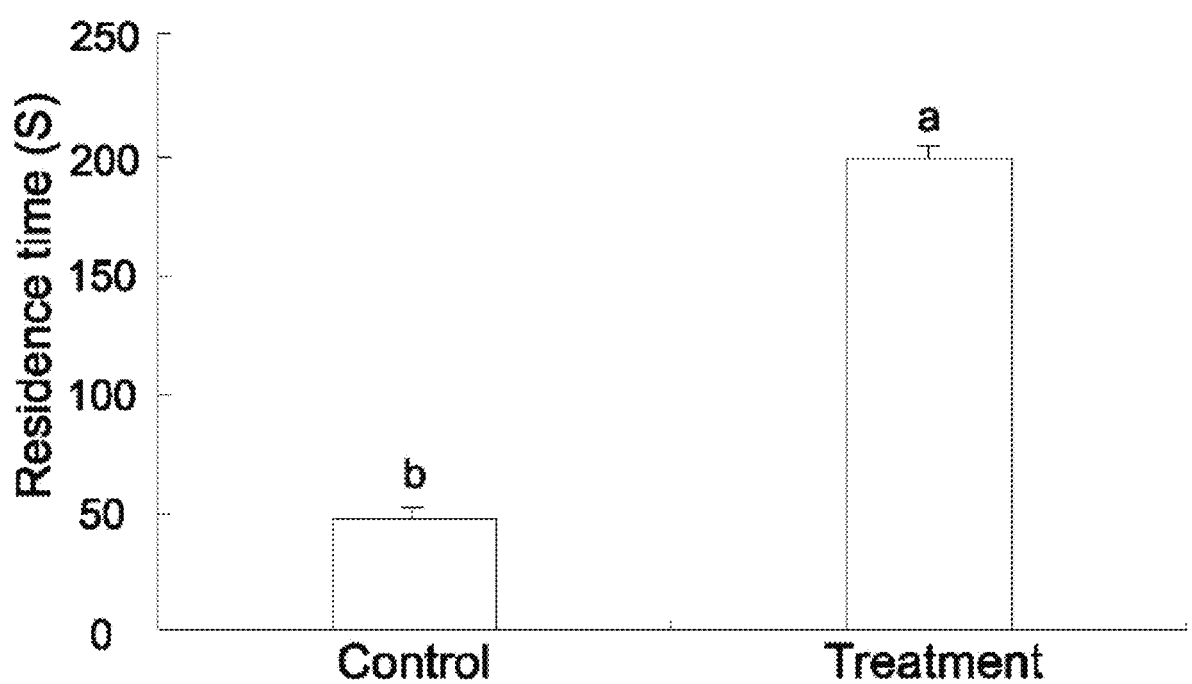

METHOD FOR MASS REARING OF *TELENOMUS REMUS*

CROSS REFERENCE TO THE RELATED APPLICATIONS

This application is based upon and claims priority to Chinese Patent Application No. 202310608005.1, filed on May 26, 2023, the entire contents of which are incorporated herein by reference.

TECHNICAL FIELD

The present disclosure belongs to the technical field of biological control of agricultural pests, and specifically relates to a method for mass rearing of *Telenomus remus*.

BACKGROUND

Tobacco pests have always been a major problem affecting the production quality and benefit of flue-cured tobacco. Tobacco pests are mainly pests of the Noctuidae family in the order Lepidoptera. *Spodoptera litura* is present in all major flue-cured tobacco production areas in China. *Spodoptera litura* has characteristics such as many annual rearing generations, large occurrence quantity, strong concealment, and sudden outbreaks, and may cause huge economic losses to tobacco farmers. Pests of the Noctuidae family also threaten large agricultural systems other than tobacco systems. *Spodoptera frugiperda* is a major migratory pest widely present in the Americas. *Spodoptera frugiperda* spreads rapidly in China due to its characteristics, such as a wide suitable growth area range, strong migration, and high reproductivity, and causes major hazards to crops such as corn and rice. A large number of egg masses laid by adult noctuids is a source of hazards caused by noctuids in the field. Therefore, an egg stage is an important window period for the control of noctuids, and the use of efficient parasitoids for eggs of noctuids is particularly important for the long-term control of pests in the Noctuidae family.

The *Telenomus remus*, a member of the Scelionidae family in the order Hymenoptera, is a major parasitoid for eggs of pests in the Noctuidae family. As early as the 1970s, there had been relevant research reports on *Telenomus remus* outside China. So far, many countries in Latin America have achieved some success in controlling *Spodoptera frugiperda* by breeding *Telenomus remus* on a large scale with eggs of *Spodoptera frugiperda* or other hosts of the Noctuidae family. Some scholars in Brazil have successfully bred *Telenomus remus* with *Corcyra cephalonica* eggs. However, recent studies by Huo Liangxiao et al. and Dai Peng et al. have shown that the current breeding of *Telenomus remus* with *Corcyra cephalonica* eggs in China is unsuccessful. Some scholars in China have bred *Telenomus remus* with *Spodoptera exigua* eggs and have systematically observed the morphological characteristics of pest states during the ontogenetic process of *Telenomus remus* and the development stages of *Telenomus remus*. Huo Liangxiao et al. have bred *Telenomus remus* with *Spodoptera litura* and have observed biological characteristics of parasitism of *Telenomus remus* in *Spodoptera litura*. However, currently, *Telenomus remus* is still bred on a small scale in China. Thus, the establishment of a mass breeding technology system for *Telenomus remus* in China is of great significance for the long-term control of pests in the Noctuidae family. The screening of a desirable rearing host is a primary problem to be solved in many technologies to allow the mass breeding of *Telenomus remus*.

SUMMARY

The technical problem to be solved by the present disclosure is to overcome the deficiencies in the prior art and to provide a method for mass rearing of *Telenomus remus*. In the present disclosure, the mass rearing of *Telenomus remus* is allowed creatively by screening egg sizes of *Corcyra cephalonica* eggs, which is of great significance for the long-term control of pests of the Noctuidae family.

To solve the above technical problem, the present disclosure adopts the following technical solutions:

A method for mass rearing of *Telenomus remus* is provided, including the following steps:

(1) establishing a *Telenomus remus* population of a *Corcyra cephalonica* strain;

(2) collecting *Corcyra cephalonica* eggs laid by *Corcyra cephalonica* on the day, and fixing the *Corcyra cephalonica* eggs on a sticker;

(3) inoculating female *Telenomus remus* of the *Corcyra cephalonica* strain in the step (1) into the *Corcyra cephalonica* eggs in the step (2); and (4) after 24 h to 48 h of a parasitism, taking parasitic *Corcyra cephalonica* eggs out, and feeding the parasitic *Corcyra cephalonica* eggs under the following conditions: a temperature: 26±1° C., a relative humidity: 65±5%, and a photoperiod: L:D=14:10, where long axes of the *Corcyra cephalonica* eggs in the step (2) have a length of 0.48 mm to 0.60 mm.

Preferably, a feed formula for feeding the *Corcyra cephalonica* in the step (2) includes the following components: a flour, a wheat bran, a soybean powder, a yeast powder, and a multivitamin; and the multivitamin includes vitamin C, riboflavin, niacin, calcium pantothenate, pyridoxine, biotin, folic acid, cobalamin, and glucose.

Preferably, the feed formula for feeding the *Corcyra cephalonica* in the step (2) includes the following components in weight percentages:

60% to 90% of the flour;
4% to 15% of the wheat bran;
4% to 20% of the soybean powder;
1% to 5% of the yeast powder; and
0.5% to 2% of the multivitamin.

Preferably, the vitamin C, the riboflavin, the niacin, the calcium pantothenate, the pyridoxine, the biotin, the folic acid, the cobalamin, and the glucose in the multivitamin are in a weight ratio of (8-20):(15-40):(35-60):(35-60):(8-20):(0.1-5):(8-20):(0.1-5):(700-800).

Preferably, the establishing a *Telenomus remus* population of a *Corcyra cephalonica* strain in the step (1) includes the following steps:

(a) preparing a crude extract of *Spodoptera litura* eggs;

(b) collecting *Corcyra cephalonica* eggs laid by *Corcyra cephalonica* on the day, and fixing the *Corcyra cephalonica* eggs on a sticker;

(c) adding the crude extract of the *Spodoptera litura* eggs prepared in the step (a) dropwise to the *Corcyra cephalonica* eggs in the step (b), and inoculating female *Telenomus remus*; and (d) after 24 h to 48 h of a parasitism, taking parasitic *Corcyra cephalonica* eggs out, and feeding the parasitic *Corcyra cephalonica* eggs in an artificial climate chamber.

Preferably, specific operations of the preparing a crude extract of *Spodoptera litura* eggs in the step (a) are as follows: collecting eggs laid by *Spodoptera litura* on the day, placing the eggs in a container, and adding a solvent to the container; sealing the container, gently shaking the container, and allowing the container to stand; and collecting a resulting supernatant.

Preferably, the *Spodoptera litura* is *Spodoptera litura* laying 500±50 eggs on the day, and a ratio of the female *Telenomus remus* to the *Corcyra cephalonica* eggs is 1:(8-12).

Preferably, the solvent is n-hexane, and the solvent is added in a volume of 2 μL to 10 μL.

Preferably, the female *Telenomus remus* of the *Corcyra cephalonica* strain inoculated in the step (3) are female *Telenomus remus* of the *Corcyra cephalonica* strain that undergo emergence within 24 h.

Preferably, in the step (3), a ratio of the female *Telenomus remus* of the *Corcyra cephalonica* strain to the *Corcyra cephalonica* eggs is 1:(8-12).

Due to the adoption of the above technical solutions, the present disclosure has the following advantages compared with the prior art:

1. In the method of the present disclosure, *Corcyra cephalonica* eggs are adopted as a host for rearing of *Telenomus remus*. A production technology of *Corcyra cephalonica* eggs is relatively mature, and a production cost of *Corcyra cephalonica* eggs is low. Thus, the method of the present disclosure allows the mass rearing of *Telenomus remus*.
2. The applicants have creatively found that a size of *Corcyra cephalonica* eggs affects a parasitism rate of *Telenomus remus* for the *Corcyra cephalonica* eggs and an emergence rate of *Telenomus remus*. Therefore, in the present disclosure, a feed formula for feeding *Corcyra cephalonica* is improved to increase a size of *Corcyra cephalonica* eggs, and when *Corcyra cephalonica* eggs with an increased size undergo consecutive generations of parasitisms of *Telenomus remus*, a parasitism rate of the *Telenomus remus* for the *Corcyra cephalonica* eggs and an emergence rate of the *Telenomus remus* can be significantly improved. The use of *Corcyra cephalonica* eggs as a substitute host for *Telenomus remus* can allow the mass rearing of *Telenomus remus* and significantly reduce a production cost.
3. In the method of the present disclosure, *Telenomus remus* is allowed to parasitize in *Corcyra cephalonica* eggs, artificially produced on a large scale, and then released in the field, which can control the occurrence of noctuid population quantity, reduce a harm of noctuid populations to crops such as flue-cured tobacco, corn, and vegetables, reduce the consumption of chemical pesticides, and improve a yield and quality of an agricultural product.

BRIEF DESCRIPTION OF THE DRAWINGS

FIGURE shows an impact of a crude extract of *Spodoptera litura* eggs on a residence time of *Telenomus remus*.

DETAILED DESCRIPTION OF THE EMBODIMENTS

In order to make the technical solutions and beneficial effects of the present disclosure clear and comprehensible, specific embodiments are listed below for detailed description. It should be understood that these embodiments are provided merely to illustrate the present disclosure rather than limit the scope of the present disclosure. Any product that is the same as or similar to the product of the present disclosure and is obtained in light of the present disclosure or by combining the present disclosure with other features of the prior art shall fall within the protection scope of the present disclosure.

If specific techniques or conditions are not indicated in the following embodiments, an embodiment is usually implemented in accordance with the conventional techniques or conditions described in the literature in the prior art, or in accordance with conditions proposed by a product specification and a manufacturer.

Unless otherwise indicated, starting raw materials, materials, and reagents are commercially available or are synthesized according to known methods.

The present disclosure provides a method for mass rearing of *Telenomus remus*, including the following steps:

(1) a *Telenomus remus* population of a *Corcyra cephalonica* strain is established;

(2) *Corcyra cephalonica* eggs laid by *Corcyra cephalonica* on the day are collected and fixed on a sticker;

(3) female *Telenomus remus* of the *Corcyra cephalonica* strain in the step (1) are inoculated into the *Corcyra cephalonica* eggs in the step (2); and (4) after 24 h to 48 h of a parasitism, parasitic *Corcyra cephalonica* eggs are taken out and fed under the following conditions: a temperature: 26±1° C., a relative humidity: 65±5%, and a photoperiod: L:D=14:10, where long axes of the *Corcyra cephalonica* eggs in the step (2) have a length of 0.48 mm to 0.60 mm.

In some specific embodiments, a feed formula for feeding the *Corcyra cephalonica* in the step (2) includes the following components: a flour, a wheat bran, a soybean powder, a yeast powder, and a multivitamin.

In some specific embodiments, the multivitamin includes vitamin C, riboflavin, niacin, calcium pantothenate, pyridoxine, biotin, folic acid, cobalamin, and glucose.

In some specific embodiments, the feed formula for feeding the *Corcyra cephalonica* in the step (2) includes the following components in weight percentages:

60% to 90% of the flour;
4% to 15% of the wheat bran;
4% to 20% of the soybean powder;
1% to 5% of the yeast powder; and
0.5% to 2% of the multivitamin.

In some specific embodiments, a weight percentage of the flour can be 65% to 90%, 70% to 90%, 70% to 85%, 75% to 85%, or 78% to 82% and more specifically can be 78%, 79%, 80%, 81%, or 82%.

In some specific embodiments, a weight percentage of the wheat bran can be 4% to 12% or 5% to 10% and more specifically can be 5%, 6%, 7%, 8%, 9%, or 10%.

In some specific embodiments, a weight percentage of the soybean powder can be 4% to 18%, 6% to 16%, or 8% to 12% and more specifically can be 8%, 9%, 10%, 11%, or 12%.

In some specific embodiments, a weight percentage of the yeast powder can be 1% to 5% and more specifically can be 1%, 2%, 3%, 4%, or 5%.

In some specific embodiments, a weight percentage of the multivitamin can be 0.5% to 1.8%, 0.7% to 1.5%, or 0.8% to 1.2% and more specifically can be 0.8%, 0.9%, 1%, 1.1%, or 1.2%.

In some specific embodiments, the vitamin C, the riboflavin, the niacin, the calcium pantothenate, the pyridoxine, the biotin, the folic acid, the cobalamin, and the glucose in the multivitamin can be in a weight ratio of (8-20):(15-40):(35-60):(35-60):(8-20):(0.1-5):(8-20):(0.1-5):(700-800), (10-18):(15-30):(40-60):(40-60):(10-18):(0.1-3):(10-18):(0.1-3):(700-800), or (10-15):(20-30):(45-55):(45-55):(10-15):(0.5-2):(10-15):(0.5-2):(700-800).

In a specific embodiment, the feed formula for feeding the *Corcyra cephalonica* in the step (2) includes the following components in weight percentages: the flour: 80%, the wheat bran: 7%, the soybean powder: 10%, the yeast powder: 2%, and the multivitamin: 1%, and the vitamin C, the riboflavin, the niacin, the calcium pantothenate, the pyridoxine, the biotin, the folic acid, the cobalamin, and the glucose in the multivitamin are in a weight ratio of 12.5:25:50:50:12.5:1:12.5:1:(700-800).

In some specific embodiments, a preparation method of a feed for feeding the *Corcyra cephalonica* in the step (2) includes the following steps:
  (1) the wheat bran is sterilized for 60 min to 90 min in a steaming box at 80° C. to 120° C.;
  (2) the flour and the soybean powder are baked separately for 30 min to 120 min in an oven at 80° C. to 120° C.; and
  (3) the treated components are cooled and placed on a tray separately and then mixed according to the specified ratio, then the multivitamin is added, and a resulting mixture is thoroughly mixed.

In some specific embodiments, the establishing a *Telenomus remus* population of a *Corcyra cephalonica* strain in the step (1) includes the following steps:
  (a) a crude extract of *Spodoptera litura* eggs is prepared;
  (b) *Corcyra cephalonica* eggs laid by *Corcyra cephalonica* on the day are collected and fixed on a sticker;
  (c) the crude extract of the *Spodoptera litura* eggs prepared in the step (a) is added dropwise to the *Corcyra cephalonica* eggs in the step (b), and female *Telenomus remus* is inoculated; and
  (d) after 24 h to 48 h of a parasitism, parasitic *Corcyra cephalonica* eggs are taken out and fed in an artificial climate chamber.

In some specific embodiments, specific operations of the preparing a crude extract of *Spodoptera litura* eggs in the step (a) are as follows: eggs laid by *Spodoptera litura* on the day are collected and placed in a container, a solvent is added to the container, the container is sealed, gently shaken, and allowed to stand, and a resulting supernatant is collected.

In some specific embodiments, the *Spodoptera litura* is *Spodoptera litura* laying 500±50 eggs on the day, and a ratio of the female *Telenomus remus* to the *Corcyra cephalonica* eggs is 1:(8-12) and more specifically 1:8, 1:9, 1:10, 1:11, or 1:12.

In some specific embodiments, the solvent is n-hexane, and the n-hexane is added in a volume of 2 mL to 10 mL, 2 mL to 8 mL, or 2 mL to 6 mL and more specifically 2 mL, 3 mL, 4 mL, 5 mL, or 6 mL. If the amount of the solvent is too large, a concentration of the extract will be reduced, a concentration process will be long, and the volatilization will be severe. If the amount of the solvent is too small, the extract cannot cover the eggs.

In some specific embodiments, in the step (c), the crude extract of the *Spodoptera litura* eggs is added in a volume of 10 μL to 30 μL, 12 μL to 28 μL, 15 μL to 25 μL, or 18 μL to 22 μL and more specifically 18 μL, 19 μL, 20 μL, 21 μL, or 22 μL. If the amount of the crude extract is too large, a surface of the *Corcyra cephalonica* eggs will be in a wet state, and thus wings of *Telenomus remus* will stick to the surface, resulting in a failed parasitism. If the amount of the crude extract is too small, there will be an insufficient attraction effect.

In some specific embodiments, the female *Telenomus remus* inoculated in the step (c) is female *Telenomus remus* that undergo emergence within 24 h.

In some specific embodiments, environmental conditions of the artificial climate chamber in the step (4) are as follows: a temperature: 26±1° C., a relative humidity: 65±5%, and a photoperiod: L:D=14:10; and more specifically are as follows: a temperature: 27° C., a relative humidity: 70%, and a photoperiod: L:D=14:10 h.

In some specific embodiments, the female *Telenomus remus* of the *Corcyra cephalonica* strain inoculated in the step (3) is female *Telenomus remus* of a *Corcyra cephalonica* strain that undergo emergence within 24 h.

In some specific embodiments, in the step (3), a ratio of the female *Telenomus remus* of the *Corcyra cephalonica* strain to the *Corcyra cephalonica* eggs is 1:(8-12) and more specifically 1:8, 1:9, 1:10, 1:11, or 1:12.

The present disclosure also provides a feed formula and method for increasing a length of a long axis of a *Corcyra cephalonica* egg.

The feed formula for increasing a length of a long axis of a *Corcyra cephalonica* egg includes the following components: a flour, a wheat bran, a soybean powder, a yeast powder, and a multivitamin.

In some specific embodiments, the multivitamin includes vitamin C, riboflavin, niacin, calcium pantothenate, pyridoxine, biotin, folic acid, cobalamin, and glucose.

In some specific embodiments, the feed formula includes the following components in weight percentages:
  60% to 90% of the flour;
  4% to 15% of the wheat bran;
  4% to 20% of the soybean powder;
  1% to 5% of the yeast powder; and
  0.5% to 2% of the multivitamin.

In some specific embodiments, a weight percentage of the flour can be 65% to 90%, 70% to 90%, 70% to 85%, 75% to 85%, or 78% to 82% and more specifically can be 78%, 79%, 80%, 81%, or 82%.

In some specific embodiments, a weight percentage of the wheat bran can be 4% to 12% or 5% to 10% and more specifically can be 5%, 6%, 7%, 8%, 9%, or 10%.

In some specific embodiments, a weight percentage of the soybean powder can be 4% to 18%, 6% to 16%, or 8% to 12% and more specifically can be 8%, 9%, 10%, 11%, or 12%.

In some specific embodiments, a weight percentage of the yeast powder can be 1% to 5% and more specifically can be 1%, 2%, 3%, 4%, or 5%.

In some specific embodiments, a weight percentage of the multivitamin can be 0.5% to 1.8%, 0.7% to 1.5%, or 0.8% to 1.2% and more specifically can be 0.8%, 0.9%, 1%, 1.1%, or 1.2%.

In some specific embodiments, the vitamin C, the riboflavin, the niacin, the calcium pantothenate, the pyridoxine, the biotin, the folic acid, the cobalamin, and the glucose in the multivitamin can be in a weight ratio of (8-20):(15-40):(35-60):(35-60):(8-20):(0.1-5):(8-20):(0.1-5):(700-800), (10-18):(15-30):(40-60):(40-60):(10-18):(0.1-3):(10-18):(0.1-3):(700-800), or (10-15):(20-30):(45-55):(45-55):(10-15):(0.5-2):(10-15):(0.5-2):(700-800).

In a specific embodiment, the feed formula includes the following components in weight percentages: the flour: 80%, the wheat bran: 7%, the soybean powder: 10%, the yeast powder: 2%, and the multivitamin: 1%, and the vitamin C, the riboflavin, the niacin, the calcium pantothenate, the pyridoxine, the biotin, the folic acid, the cobalamin, and the glucose in the multivitamin are in a weight ratio of 12.5:25:50:50:12.5:1:12.5:1:(700-800).

A preparation method of the feed formula includes the following steps:
(1) the wheat bran is sterilized for 60 min to 90 min in a steaming box at 80° C. to 120° C.;
(2) the flour and the soybean powder are baked separately for 30 min to 120 min in an oven at 80° C. to 120° C.; and
(3) the treated components are cooled and placed on a tray separately and then mixed according to the specified ratio, then the multivitamin is added, and a resulting mixture is thoroughly mixed.

The method for increasing a length of a long axis of a *Corcyra cephalonica* egg is as follows: the *Corcyra cephalonica* egg is fed with the above feed formula under the following conditions: a temperature: 25±1° C., a relative humidity: 65%±5%, and a photoperiod: 14:10. The following raw materials, materials, or reagents are adopted in the examples below:

Feed components (a flour, a soybean powder, a wheat bran, a yeast powder, and a multivitamin), a sticker, a brush pen, a plastic box (25.3 cm*17.3 cm*9.3 cm), an absorbent cotton, a stereoscopic microscope, an artificial climate chamber, *Spodoptera litura*, a crude extract of 1-day-old *Spodoptera litura* eggs, a refrigerator, *Corcyra cephalonica* eggs, *Telenomus remus*, 15% honey water, a vial, n-hexane (chromatographically pure), and a glass syringe.

Test Insects

*Telenomus remus* is collected from egg masses of *Spodoptera frugiperda* in a corn field in Ruili City of Yunnan Province. A *Telenomus remus* population is established indoors. *Spodoptera litura* is collected from a tobacco field in Kunming City of Yunnan Province. A *Spodoptera litura* population is established indoors through sub-cultivation. *Spodoptera litura* eggs are egg masses collected indoors on the day. *Corcyra cephalonica* is provided by the Yunnan Agricultural University and has been bred indoors until now. *Corcyra cephalonica* eggs are eggs collected indoors on the day.

Example 1

Establishment of a *Telenomus remus* population of a *Corcyra cephalonica* strain
Experimental Method:

About 500 *Spodoptera litura* eggs laid on the day were selected, swept off by a brush pen, and placed in a vial, then 4 mL of n-hexane was added to the vial, and the vial was sealed, shaken gently for 1 min, and then allowed to stand for 10 min. A resulting supernatant (namely, a crude extract of the *Spodoptera litura* eggs) was drawn out by a glass syringe, concentrated to 2 mL under high-purity nitrogen, and stored in a refrigerator at −18° C. for later use. Since volatiles could easily cause a contamination to affect an analysis result, the crude extract was concentrated by the inventors. Given a balance between a concentration and a number of use times, the crude extract was concentrated to 2 mL.

The experiment was conducted in a darkroom with red light.
1-1. Impact of the Crude Extract of *Spodoptera litura* Eggs on a Residence Time of *Telenomus remus*

In a treatment group, *Corcyra cephalonica* eggs laid on the day were collected and fixed on a sticker with a side length of 1 cm (about 120 to 150 eggs), then 20 μL of the crude extract was taken and added dropwise to the *Corcyra cephalonica* eggs, a female *Telenomus remus* that would undergo emergence within 24 h was placed in the middle of an egg mass, and timing was started to record a residence time of the female *Telenomus remus* on the egg mass. If the female *Telenomus remus* left a filter paper within 5 min and did not return within 20 min, the observation would be stopped. If the female *Telenomus remus* returned within 20 min, the observation would continue. In this experiment, *Corcyra cephalonica* eggs were adopted as a control group (the control group was different from the treatment group in that the crude extract was not added dropwise). Positions of the treatment group and the control group were exchanged after every 5 *Telenomus remus* were tested to avoid an impact of positions, wind, or the like on a result. In this experiment, 20 female *Telenomus remus* were tested, namely, 20 replicates.

1-2. Parasitism States of *Telenomus remus* in *Corcyra cephalonica* Eggs

In a treatment group, *Corcyra cephalonica* eggs laid on the day were collected and fixed on a sticker with a side length of 1 cm (about 120 to 150 eggs), then 20 μL of the crude extract was taken and added dropwise to the *Corcyra cephalonica* eggs, then female *Telenomus remus* that would undergo emergence within 24 h were inoculated according to a *Telenomus remus*/egg ratio of 1:10, and 15% honey water was added to provide nutrients for the female *Telenomus remus*. After 48 h of a parasitism, the *Corcyra cephalonica* eggs were taken out and fed in an artificial climate chamber under the environmental conditions of 27° C., RH=70%, and L:D=14:10 h, and spawn larvae were swept out in time. Egg masses were continuously cultivated until eggs turned black, indicating that the eggs were successfully parasitized. After 8 d of a parasitism, a parasitism state was observed under a stereoscopic microscope and a number of parasitic eggs was counted. Then, a parasitism was continued until *Telenomus remus* of a *Corcyra cephalonica* strain successfully emerged. In this experiment, *Corcyra cephalonica* eggs were adopted as a control group (the control group was different from the treatment group in that the crude extract was not added dropwise).

Parasitism rate (%)=number of parasitic eggs/number of total eggs*100%

Emergence rate (%)=number of emerged adult *Telenomus remus*/number of parasitic eggs*100%

2. Result Analysis
2-1. The Impact of the Crude Extract of *Spodoptera litura* Eggs on a Residence Time of *Telenomus remus* is Shown in the FIGURE.

It can be seen from the FIGURE that the use of the crude extract of *Spodoptera litura* eggs has a great impact on a residence time of *Telenomus remus* with a significant difference (P<0.05), and a residence time of *Telenomus remus* in the treatment group is 200 s and is 152 s higher than 48 s of the control group.

2-2. Parasitism States of *Telenomus remus* in *Corcyra cephalonica* Eggs are Shown in Table 1.

TABLE 1

Parasitism states of *Telenomus remus* in *Corcyra cephalonica* eggs

| Group | Parasitism number | Egg number | Parasitism rate (%) | Emergence rate (%) |
|---|---|---|---|---|
| Treatment | 1 | 390 | 0.00 | 0.00 |
|  | 2 | 420 | 0.03 | 0.00 |

TABLE 1-continued

Parasitism states of *Telenomus remus* in *Corcyra cephalonica* eggs

| Group | Parasitism number | Egg number | Parasitism rate (%) | Emergence rate (%) |
|---|---|---|---|---|
|  | 3 | 450 | 0.13 | 0.00 |
|  | 4 | 360 | 0.28 | 0.00 |
|  | 5 | 390 | 0.51 | 0.00 |
|  | 6 | 450 | 11.56 | 26.92 |
|  | 7 | 420 | 10.11 | 24.33 |
| Control | 1 | 390 | 0.00 | 0.00 |
|  | 2 | 420 | 0.00 | 0.00 |
|  | 3 | 450 | 0.00 | 0.00 |
|  | 4 | 360 | 0.00 | 0.00 |
|  | 5 | 390 | 0.00 | 0.00 |
|  | 6 | 450 | 0.00 | 0.00 |
|  | 7 | 430 | 0.00 | 0.00 |

It can be seen from Table 1 that, in the treatment group, after the crude extract of *Spodoptera litura* eggs is added dropwise to the *Corcyra cephalonica* eggs, a small number of the *Corcyra cephalonica* eggs can be parasitized by *Telenomus remus*, but the emergence is unsuccessful, and after a parasitism rate is greatly increased during the 6th-generation and 7th-generation parasitisms and emergence is successful, an emergence rate is as high as about 25%, and then an emerged adult *Telenomus remus* is used as a parent seed *Telenomus remus* for continuous parasitism. An F1 generation has been bred, and the F1 generation refers to a first batch of bred *Telenomus remus*. However, *Corcyra cephalonica* eggs in the control group do not undergo a parasitism after 7 times of parasitism operations.

Example 2

Impact of a size of *Corcyra cephalonica* eggs on a parasitism of *Telenomus remus* in the *Corcyra cephalonica* eggs
1. Experimental Method
1-1. Preparation of a Feed for *Corcyra cephalonica*

| Feed formula for *Corcyra cephalonica* | Components (in weight percentages) |
|---|---|
| A | 70% of a corn powder + 20% of a soybean powder + 10% of a wheat bran |
| B | 70% of a corn powder + 20% of a wheat bran + 3% of a yeast powder + 7% of a white granulated sugar |
| C | 80% of a flour, 7% of a wheat bran, 10% of a soybean powder, 2% of a yeast powder, and 1% of a multivitamin, where the multivitamin includes vitamin C, riboflavin, niacin, calcium pantothenate, pyridoxine, biotin, folic acid, cobalamin, and glucose in a weight ratio of 12.5:25:50:50:12.5:1:12.5:1:800 |
| D | 80% of a flour, 7% of a wheat bran, 10% of a soybean powder, 2% of a yeast powder, and 1% of a multivitamin, where the multivitamin includes vitamin C, riboflavin, niacin, calcium pantothenate, pyridoxine, biotin, folic acid, cobalamin, and glucose in a weight ratio of 8:15:35:35:8:0.1:8:0.1:750 |
| E | 80% of a flour, 7% of a wheat bran, 10% of a soybean powder, 2% of a yeast powder, and 1% of a multivitamin, where the multivitamin includes vitamin C, riboflavin, niacin, calcium pantothenate, pyridoxine, biotin, folic acid, cobalamin, and glucose in a weight ratio of 20:40:60:60:20:5:20:5:700 |

The feed for *Corcyra cephalonica* was prepared as follows: A wheat bran was steamed for 60 min in a steaming box at 100° C., and a flour, a soybean powder, and a corn powder each were baked for 60 min in an oven at 100° C.; the treated components each were cooled and placed in a plastic box for later use; and then according to formulas A, B, C, D, and E, components of each formula were poured into a feed tray according to a specified ratio and thoroughly mixed to obtain five feeds A, B, C, D, and E for *Corcyra cephalonica*, respectively.

1-2. Impacts of Different Feed Formulas on Biological Indexes of *Corcyra cephalonica*

2,000 *Corcyra cephalonica* eggs were placed in each feed and fed under the following conditions: a temperature: 25±1° C., a relative humidity: 65%±5%, and a photoperiod: 14:10. The *Corcyra cephalonica* eggs were observed at any time, and the feed was added on time. Then a growth state of *Corcyra cephalonica* was observed every day. After *Corcyra cephalonica* adults emerged, 10 pairs of *Corcyra cephalonica* adults were randomly selected and placed in a plastic box to lay eggs, 20 eggs were selected from *Corcyra cephalonica* eggs collected on the first day and tested for a particle size, and then a number of eggs laid every day was counted until the *Corcyra cephalonica* adults died. Within 12 h after death of the *Corcyra cephalonica* adults, 10 intact *Corcyra cephalonica* adults were selected and tested for a body length.

1-3. Impact of a Size of *Corcyra cephalonica* Eggs on a Parasitism of *Telenomus remus* in the *Corcyra cephalonica* Eggs 10 pairs of *Corcyra cephalonica* adults were randomly selected from *Corcyra cephalonica* adults cultivated by each of two formulas to lay eggs, and eggs laid on the first day were adopted as test eggs. *Corcyra cephalonica* eggs obtained from formulas A and C were fixed on a sticker with a side length of 1 cm (about 120 to 150 eggs), then female *Telenomus remus* of a *Corcyra cephalonica* strain (obtained in Example 1) that would undergo emergence within 24 h were inoculated according to a *Telenomus remus*/egg ratio of 1:10, and 15% honey water was added to provide nutrients for the female *Telenomus remus*. After 48 h of a parasitism, the *Corcyra cephalonica* eggs were taken out and each were fed in an artificial climate chamber under the environmental conditions of 27° C., RH=70%, and L:D=14:10 h, and spawn larvae were swept out in time. After 8 d of a parasitism, a parasitism state was observed under a stereoscopic microscope and a number of parasitic eggs was counted. A parasitism rate and an emergence rate were calculated. For the subsequent 20th-generation to 30th-generation parasitisms, female *Telenomus remus* emerging in the previous generation were used to parasitize *Corcyra cephalonica* eggs, and then a parasitism rate and an emergence rate were detected every 5 generations.

Parasitism rate (%)=number of parasitic eggs/number of total eggs*100%

Emergence rate (%)=number of emerged adult *Telenomus remus*/number of parasitic eggs*100%

2. Result Analysis 2-1. Impacts of Different Feed Formulas on an Egg Yield, an Adult Body Length, and an Egg Size of Female *Corcyra cephalonica* are Shown in Table 2.

TABLE 2

Impacts of different feed formulas on biological indexes of *Corcyra cephalonica*

| Formula | Egg yield | Adult body length (cm) | Egg long axis length (mm) |
| --- | --- | --- | --- |
| A | 482.9 | 1.12 | 0.41 |
| B | 547.6 | 1.15 | 0.42 |
| C | 856.3 | 1.52 | 0.54 |
| D | 823.1 | 1.47 | 0.50 |
| E | 839.5 | 1.50 | 0.49 |

It can be seen from Table 2 that *Corcyra cephalonica* fed with the formulas C, D, and E is better than *Corcyra cephalonica* fed with the formula A in terms of an egg yield, an adult body length, and an egg size.

2-2. An Impact of a Size of *Corcyra cephalonica* Eggs on a Parasitism of *Telenomus remus* in the *Corcyra cephalonica* Eggs is Shown in Table 3.

TABLE 3

Impact of a size of *Corcyra cephalonica* eggs on a parasitism of *Telenomus remus* in the *Corcyra cephalonica* eggs

| Different formulas | Generation | Parasitism rate (%) | Emergence rate (%) |
| --- | --- | --- | --- |
| A | 1 | 11.56 | 19.69 |
|   | 5 | 10.34 | 21.55 |
|   | 10 | 12.57 | 23.87 |
|   | 15 | 13.25 | 22.48 |
|   | 20 | 12.11 | 21.59 |
|   | 25 | 13.34 | 24.51 |
|   | 30 | 12.18 | 23.89 |
| C | 1 | 14.71 | 25.93 |
|   | 5 | 22.50 | 27.23 |
|   | 10 | 27.38 | 35.71 |
|   | 15 | 35.01 | 51.07 |
|   | 20 | 54.39 | 60.27 |
|   | 25 | 77.00 | 72.92 |
|   | 30 | 85.00 | 85.72 |

The above results show that, when large *Corcyra cephalonica* eggs are used as a substitute host, a parasitism rate of *Telenomus remus* for the *Corcyra cephalonica* eggs and an emergence rate of *Telenomus remus* are significantly increased after 30 consecutive generations of feeding of the *Telenomus remus*, which can allow the mass rearing.

It should be understood that the above embodiments are illustrative and are not intended to include all possible embodiments covered by the claims. Without departing from the scope of the present disclosure, various modifications and changes may be made on the basis of the above embodiments. Similarly, individual technical features of the above embodiments may be arbitrarily combined to produce an additional embodiment of the present disclosure that may not be explicitly described. Therefore, the above embodiments only express several implementations of the present disclosure, and do not limit the protection scope of the present disclosure.

What is claimed is:

1. A method for a mass rearing of a *Telenomus remus*, comprising the following steps:
    (1) establishing a *Telenomus remus* population of a *Corcyra cephalonica* strain,
    wherein the step (1) comprises:
    (a) preparing a crude extract of *Spodoptera litura* eggs;
    (b) collecting first *Corcyra cephalonica* eggs laid by a *Corcyra cephalonica* on a day, and fixing the first *Corcyra cephalonica* eggs on a first sticker;
    (c) adding the crude extract of the *Spodoptera litura* eggs prepared in the step (a) dropwise to the first *Corcyra cephalonica* eggs in the step (b), and inoculating a female *Telenomus remus*; and
    (d) after 24 h to 48 h of a first parasitism, taking first parasitic *Corcyra cephalonica* eggs out, and feeding the first parasitic *Corcyra cephalonica* eggs in an artificial climate chamber;
    (2) collecting second *Corcyra cephalonica* eggs laid by the *Corcyra cephalonica* on the day, and fixing the second *Corcyra cephalonica* eggs on a second sticker;
    (3) inoculating a female *Telenomus remus* of the *Corcyra cephalonica* strain in the step (1) into the second *Corcyra cephalonica* eggs in the step (2); and
    (4) after 24 h to 48 h of a second parasitism, taking second parasitic *Corcyra cephalonica* eggs out, and feeding the second parasitic *Corcyra cephalonica* eggs under the following conditions: a temperature: 26±1° C., a relative humidity: 65±5%, and a photoperiod: L:D=14:10,
    wherein long axes of the second *Corcyra cephalonica* eggs in the step (2) have a length of 0.48 mm to 0.60 mm; and
    operations of preparing the crude extract of the *Spodoptera litura* eggs in the step (a) are as follows: collecting eggs laid by a *Spodoptera litura* on the day, placing the eggs in a container, and adding a solvent to the container; sealing the container, gently shaking the container, and allowing the container to stand; and collecting a resulting supernatant from the container.

2. The method for the mass rearing of the *Telenomus remus* according to claim 1, wherein a feed formula for feeding the *Corcyra cephalonica* in the step (2) comprises the following components: a flour, a wheat bran, a soybean powder, a yeast powder, and a multivitamin; and
    the multivitamin comprises vitamin C, riboflavin, niacin, calcium pantothenate, pyridoxine, biotin, folic acid, cobalamin, and glucose.

3. The method for the mass rearing of the *Telenomus remus* according to claim 2, wherein the feed formula for feeding the *Corcyra cephalonica* in the step (2) comprises the following components in weight percentages:
    60% to 90% of the flour;
    4% to 15% of the wheat bran;
    4% to 20% of the soybean powder;
    1% to 5% of the yeast powder; and
    0.5% to 2% of the multivitamin.

4. The method for the mass rearing of the *Telenomus remus* according to claim 3, wherein the vitamin C, the riboflavin, the niacin, the calcium pantothenate, the pyridoxine, the biotin, the folic acid, the cobalamin, and the glucose in the multivitamin are in a weight ratio of (8-20):(15-40):(35-60):(35-60):(8-20):(0.1-5):(8-20):(0.1-5):(700-800).

5. The method for the mass rearing of the *Telenomus remus* according to claim 1, wherein the *Spodoptera litura* is a *Spodoptera litura* laying 500±50 eggs on the day, and a ratio of the female *Telenomus remus* to the first *Corcyra cephalonica* eggs is 1:(8-12).

6. The method for the mass rearing of the *Telenomus remus* according to claim 1, wherein the solvent is n-hexane, and the solvent is added to the container in a volume of 2 μL to 10 μL.

7. The method for the mass rearing of the *Telenomus remus* according to claim 1, wherein the female *Telenomus remus* of the *Corcyra cephalonica* strain inoculated in the step (3) is a female *Telenomus remus* of the *Corcyra cephalonica* strain undergoing emergence within 24 h.

8. The method for the mass rearing of the *Telenomus remus* according to claim 1, wherein in the step (3), a ratio of the female *Telenomus remus* of the *Corcyra cephalonica* strain to the second *Corcyra cephalonica* eggs is 1:(8-12).

9. The method for the mass rearing of the *Telenomus remus* according to claim 1, wherein a feed formula for feeding the *Corcyra cephalonica* in the step (2) comprises the following components in weight percentages:

60% to 90% of a flour;
4% to 15% of a wheat bran;
4% to 20% of a soybean powder;
1% to 5% of a yeast powder; and
0.5% to 2% of a multivitamin.

\* \* \* \* \*